(12) United States Patent
Han et al.

(10) Patent No.: US 11,587,219 B2
(45) Date of Patent: Feb. 21, 2023

(54) METHOD AND APPARATUS FOR DETECTING PIXEL DEFECT OF OPTICAL MODULE, AND DEVICE

(71) Applicant: GOERTEK INC., Shandong (CN)

(72) Inventors: Xinxin Han, Weifang (CN); Zhiyong Zhao, Weifang (CN); Nanjing Dong, Weifang (CN); Debo Sun, Weifang (CN)

(73) Assignee: GOERTEK INC., Weifang (CN)

( * ) Notice: Subject to any disclaimer, the term of this patent is extended or adjusted under 35 U.S.C. 154(b) by 243 days.

(21) Appl. No.: 17/051,728

(22) PCT Filed: Sep. 6, 2018

(86) PCT No.: PCT/CN2018/104399
§ 371 (c)(1),
(2) Date: Oct. 29, 2020

(87) PCT Pub. No.: WO2019/227762
PCT Pub. Date: Dec. 5, 2019

(65) Prior Publication Data
US 2021/0248734 A1 Aug. 12, 2021

(30) Foreign Application Priority Data

May 31, 2018 (CN) .......................... 201810553658.3

(51) Int. Cl.
*G06T 7/00* (2017.01)
*G06T 7/136* (2017.01)
(Continued)

(52) U.S. Cl.
CPC ....... *G06T 7/0004* (2013.01); *G01N 21/8851* (2013.01); *G06T 7/11* (2017.01);
(Continued)

(58) Field of Classification Search
None
See application file for complete search history.

(56) References Cited

U.S. PATENT DOCUMENTS 5,787,577 A * 8/1998 Kent .................. H05K 13/0813
29/721
11,337,432 B1 * 5/2022 Tao ....................... A22C 29/025
(Continued)

FOREIGN PATENT DOCUMENTS

| CN | 103413288 A | 11/2013 |
|---|---|---|
| CN | 103676242 A | 3/2014 |

(Continued)

OTHER PUBLICATIONS

Bandyopadhyay, S., & Mandal, S. (2000). Effect of Gray Component Replacement on Color Reproduction. In IS and TS PICS Conference (pp. 188-191). Society for Imaging Science & Technology. (Year: 2000).*

(Continued)

*Primary Examiner* — Emily C Terrell
*Assistant Examiner* — Nathan J Bloom
(74) *Attorney, Agent, or Firm* — Maschoff Brennan (57) ABSTRACT

Provided are a method and an apparatus for detecting pixel defect of optical module, and a device, where the method includes: graying an image obtained by imaging a test binary image by an optical module in a darkroom environment to obtain a first grayscale image; determining a first grayscale area and a second grayscale area corresponding to two gray levels in the test binary image from the first grayscale image; determining a pixel point not matching a grayscale feature of respective grayscale region from the first grayscale area and the second grayscale area respectively as a pixel defect point; and determining the pixel defect of the optical module according to the pixel defect point. The technical solution provided in the present disclosure can detect accurately a (Continued)

pixel defect of an optical module which is advantageous in optimizing the processing technology of the optical module.

19 Claims, 4 Drawing Sheets

(51) Int. Cl.
  *G06T 7/62* (2017.01)
  *G06T 7/11* (2017.01)
  *G06T 7/66* (2017.01)
  *G06T 7/13* (2017.01)
  *G01N 21/88* (2006.01)
  *G09G 5/10* (2006.01)
  *H04N 9/31* (2006.01)

(52) U.S. Cl.
  CPC ............... *G06T 7/13* (2017.01); *G06T 7/136* (2017.01); *G06T 7/62* (2017.01); *G06T 7/66* (2017.01); *G06T 2207/30168* (2013.01); *G09G 5/10* (2013.01); *G09G 2330/10* (2013.01); *H04N 9/3194* (2013.01)

(56) References Cited

U.S. PATENT DOCUMENTS

| | | | | |
|---|---|---|---|---|
| 2013/0044347 | A1* | 2/2013 | Kitai | H04N 1/4092 358/1.14 |
| 2014/0226189 | A1* | 8/2014 | Kojima | H04N 1/00005 358/406 |
| 2014/0294298 | A1* | 10/2014 | Palanivel | H04N 1/4052 382/167 |
| 2018/0108122 | A1* | 4/2018 | Fukase | G06T 7/12 |
| 2021/0343001 | A1* | 11/2021 | Grama | G06N 3/0454 |
| 2022/0038676 | A1* | 2/2022 | Liang | H04N 5/232 |

FOREIGN PATENT DOCUMENTS

| | | |
|---|---|---|
| CN | 104700424 A | 6/2015 |
| CN | 105447854 A | 3/2016 |
| CN | 106897994 A | 6/2017 |

OTHER PUBLICATIONS

Chinese Office Action dated Sep. 1, 2019 as received in application No. 2018105536583.

Chinese Office Action dated Apr. 2, 2020 as received in application No. 2018105536583.

* cited by examiner

METHOD AND APPARATUS FOR DETECTING PIXEL DEFECT OF OPTICAL MODULE, AND DEVICE

TECHNICAL FIELD

The present disclosure relates to the field of assembling technology, and in particular a method and an apparatus for detecting pixel defect of an optical module, and a device.

BACKGROUND

Nowadays, there are more and more optical modules with independent functions in the market to meet diversified market demands. These optical modules can be embedded in other devices to perform their functions, such as camera modules, projection modules, LED (short for Light Emitting Diode) optical modules, VR (short for Virtual Reality)/AR (short for Augmented Reality) optical modules and so on.

However, due to the limitation of the production process, some optical modules may have pixels that cannot work normally, and these pixels that cannot work normally are called pixel defects. In order to further optimize the performance of the optical module, it is necessary to control the size of the area of the pixel defect in the optical module. Under this demand, a method for detecting pixel defect is urgently needed.

SUMMARY

Various aspects of the present disclosure provide a method and an apparatus for detecting pixel defect of an optical module, and a device, which are used to detect the pixel defect of the optical module.

The present disclosure provides a method for detecting pixel defect of an optical module, including: graying an image obtained by imaging a test binary image by an optical module in a darkroom environment to obtain a first grayscale image; determining a first grayscale area and a second grayscale area corresponding to two gray levels in the test binary image from the first grayscale image; determining a pixel point not matching a grayscale feature of respective grayscale region from the first grayscale area and the second grayscale area respectively as a pixel defect point; and determining the pixel defect of the optical module according to the pixel defect point.

Further optionally, the determining the pixel defect of the optical module according to the pixel defect point includes: locating a contour of a pixel defect area composed of the pixel defect point; calculating an area and a center-of-mass coordinate of the pixel defect area according to the contour of a pixel defect area; and determining the pixel defect of the optical module on a display screen of the optical module according to the area and the center-of-mass coordinate of the pixel defect area.

Further optionally, the determining the first grayscale area and the second grayscale area corresponding to two gray levels in the test binary image from the first grayscale image includes: analyzing a grayscale distribution of the first grayscale image line by line; determining a pixel point with a grayscale change greater than a set grayscale contrast as a boundary pixel point based on the grayscale distribution; and dividing the first grayscale image into the first grayscale area and the second grayscale area according to the boundary pixel point.

Further optionally, the test binary image includes: a white pattern with a gray level of 1 and a black pattern with a gray level of 0; the first grayscale area and the second grayscale area are image areas in the first grayscale image corresponding to the white pattern and the black pattern in the test binary image respectively.

Further optionally, the determining the pixel point not matching the grayscale feature of respective grayscale region from the first grayscale area and the second grayscale area respectively as a pixel defect point includes: determining a pixel point with a grayscale value being less than a first set threshold value from the first grayscale area as a pixel point not matching the grayscale feature of the first grayscale area; and determining a pixel point with a grayscale value being greater than a second set threshold value from the second grayscale area as a pixel point not matching the grayscale feature of the second grayscale area.

Further optionally, the test binary image includes: a first test binary image and a second test binary image; where, in the first test binary image, the white pattern is a white rectangle being located at a center of the first test binary image, and the black pattern is a black rectangular frame wrapping around the white rectangle; in the second test binary image, the black pattern is a black rectangle being located at a center of the second test binary image, and the white pattern is a white rectangular frame wrapping around the black rectangle.

Further optionally, where a proportion of the white rectangle in the first test binary image is not equal to a proportion of black rectangle in the second test binary image.

The present disclosure further provides an apparatus for detecting pixel defect of an optical module, including: an image collecting module, configured to gray an image obtained by imaging a test binary image by an optical module in a darkroom environment to obtain a first grayscale image; a grayscale area dividing module, configured to determine a pixel point not matching a grayscale feature of respective grayscale region from the first grayscale area and the second grayscale area respectively as a pixel defect point; a pixel defect point detecting module, configured to determine a pixel point not matching a grayscale feature of respective grayscale region from the first grayscale area and the second grayscale area respectively as a pixel defect point; and a pixel defect determining module, configured to determine the pixel defect of the optical module according to the pixel defect point.

Further optionally, the pixel defect determining module is specifically configured to: locate a contour of a pixel defect area composed of the pixel defect point; calculate an area and a center-of-mass coordinate of the pixel defect area according to the contour of a pixel defect area; and determine the pixel defect of the optical module on a display screen of the optical module according to the area and the center-of-mass coordinate of the pixel defect area.

The present disclosure further provides an electronic device, including: a memory and a processor; where the memory is used to store at least one computer instruction; and the processor is coupled with the memory for executing the method for detecting pixel defect of an optical module provided by the present disclosure.

In the present disclosure, the binary image is used as the test image to make the optical module image, and the imaging result of the optical module is analyzed with grayscale to determine an abnormal pixel in the image imaged by the optical module. Based on the abnormal pixel in the image, the pixel defect in the optical module may be determined. In such a technical solution, the pixel defect of the optical module is effectively detected which is advantageous in optimizing the processing technology of the optical module.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

The core of the embodiment of the present disclosure is to take an image imaged by an optical module, and determine the pixel feature of the optical module according to the pixel feature of the image. The pixel of the optical module is the smallest display unit on the display screen in the optical module, and its size is determined by the hardware structure of the display screen. The collected pixel of the image imaged by the optical module refers to the minimum resolution unit on the collected image, and its size is determined by the resolution of the pattern collector that collects the image imaged by the optical module. In this embodiment, in order to distinguish the above two types of pixels involved, the pixel on the collected image is described by a pixel point. The pixel of the optical module is described in terms of a pixel unit, which will not be explained later.

Figure 1:
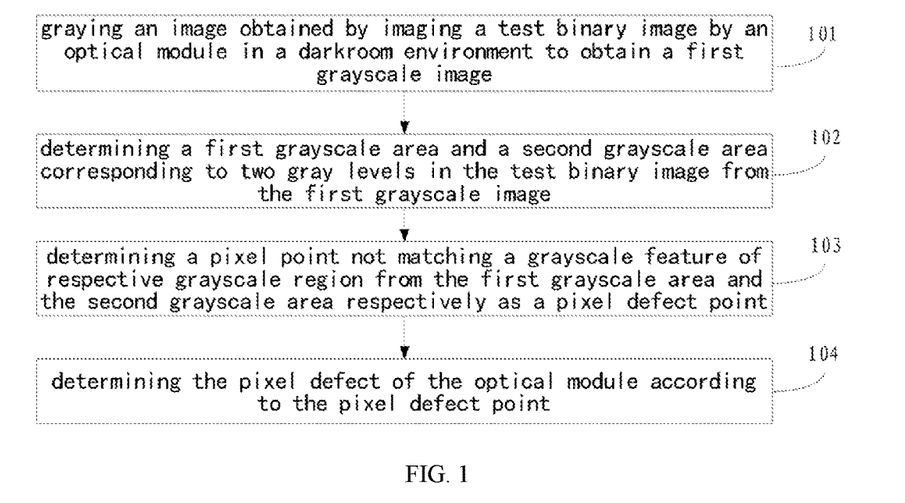
FIG. 1 is a flowchart of a method for detecting pixel defect of an optical module according to an embodiment of the present disclosure.

FIG. 1 is a flowchart of a method for detecting pixel defect of an optical module according to an embodiment of the present disclosure. As shown in FIG. 1, the method includes:

step 101: graying an image obtained by imaging a test binary image by an optical module in a darkroom environment to obtain a first grayscale image;

step 102: determining a first grayscale area and a second grayscale area corresponding to two gray levels in the test binary image from the first grayscale image;

step 103: determining a pixel point not matching a grayscale feature of respective grayscale region from the first grayscale area and the second grayscale area respectively as a pixel defect point; and step 104: determining the pixel defect of the optical module according to the pixel defect point.

In this embodiment, the optical module images in the darkroom environment, which may avoid the interference of ambient light on the imaging effect of the optical module, and improve the accuracy and reliability of detection result of the pixel defect.

When the optical module is imaging, there are some pixel units in a non-working state on the display screen of the optical module with pixel defect, and this part of the pixel units cannot emit image light. As a result, in the image imaged by the optical module, the brightness of the pixel corresponding to the pixel defect on the display screen is different from its theoretically corresponding brightness. In order to obtain this brightness difference, in this embodiment, a binary image with a relatively single brightness is used as the test image, and the optical module images according to the test binary image. The test binary image has only two kinds of brightness, and the brightness difference after imaging is more obvious, which is advantageous in detecting pixel defect according to pixel brightness.

After the optical module images according to the test binary image, a first grayscale image corresponding to the image is obtained. Different from the binary image, a grayscale image include black, white, and multiple different gray levels between black and white. The gray level can express the brightness of the image, for example, white means the brightest and black means the darkest. Therefore, based on the brightness of the pixels shown in the first grayscale image, it can be determined which pixel on the display screen of the optical module does not emit image light. It should be understood that the use of "first" to define the grayscale image corresponding to the image is only for the convenience of description and does not constitute any limitation to the present disclosure.

Since the first grayscale image is obtained by imaging the test binary image by the optical module, each of the two gray levels in the test binary image should correspond to one image area in the first grayscale image, and two images corresponding to each of two gray levels have a large gray level difference. In this embodiment, the image areas corresponding to the two gray levels in the test binary image in the first grayscale image are respectively marked as the first grayscale area and the second grayscale area. It should be understood that the first grayscale area and the second grayscale area each have a specific grayscale feature, and the grayscale feature is associated with the gray level of the test binary image. For example, assuming that the black area with a gray level of 0 in the test binary image corresponds to the first grayscale area in the first grayscale image, the feature of the first grayscale area may be: the brightness of the pixel in the area being relative darker, close to black and grayscale value being less than 5.

Thereby, based on the above analysis, it can be known that when there are some pixels in a grayscale area whose grayscale value do not match the grayscale feature of the area, it can be considered that the object point corresponding to the pixel point is a defect point, that is to say, a pixel unit in a non-working state appears at the position corresponding to the pixel point on the optical module. Therefore, after determining the pixel defect point on the first grayscale image, the pixel defect on the optical module can be inferred correspondingly.

It should be noted that, in this embodiment, the pixel defect of the optical module refers to a general term for pixels in the optical module that cannot work normally. In some cases, when one pixel unit of the optical module has a defect, it may appear as a plurality of abnormal pixel points on the first grayscale image.

In this embodiment, the binary image is used as the test image to make the optical module image, and the imaging result of the optical module is analyzed with grayscale to determine abnormal a pixel unit in the image imaged by the optical module. Based on the abnormal pixel in the image, the pixel defect in the optical module can be determined. In such a technical solution, the pixel defect of the optical module is effectively detected, which is advantageous in optimizing of the processing technology of the optical module.

The foregoing or following embodiments of the present disclosure are applicable to a projection optical module, a VR optical module, and other optical modules capable of imaging. Among these optical modules capable of imaging, there is usually a display screen, and the display screen can image by optical elements in the optical module. For example, in a VR module, the VR display screen can image an enlarged virtual image through a lens placed in front of the display screen; for another example, in a three-piece projection module, the display screen can project an image to the projection screen, through the mirror, the polarizer, and the positive lens. The method provided by the foregoing or following embodiments of the present disclosure can be used to detect pixel defect of the display screen in the foregoing optical module, and the specific detection method may refer to the records in each embodiment.

Figure 2A:
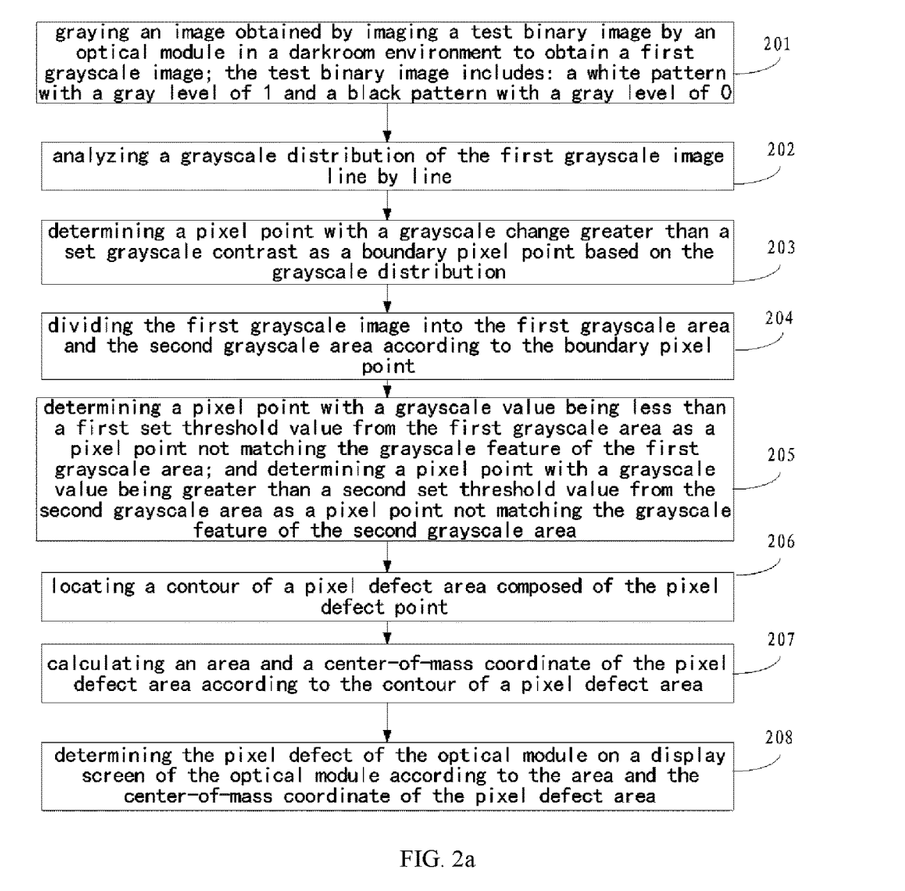
FIG. 2a is a flowchart of a method for detecting pixel defect of an optical module according to another embodiment of the present disclosure.

The following part will specifically describe a method for detecting pixel defect of an optical module according to the present disclosure with a specific optional embodiment in conjunction with FIG. 2a.

FIG. 2a is a flowchart of a method for detecting pixel defect of an optical module according to another embodiment of the present disclosure. As shown in FIG. 2a, the method includes:

step 201: graying an image obtained by imaging a test binary image by an optical module in a darkroom environment to obtain a first grayscale image; the test binary image includes: a white pattern with a gray level of 1 and a black pattern with a gray level of 0;

step 202: analyzing a grayscale distribution of the first grayscale image line by line;

step 203: determining a pixel point with a grayscale change greater than a set grayscale contrast as a boundary pixel point based on the grayscale distribution;

step 204: dividing the first grayscale image into the first grayscale area and the second grayscale area according to the boundary pixel point;

step 205: determining a pixel point with a grayscale value being less than a first set threshold value from the first grayscale area as a pixel point not matching the grayscale feature of the first grayscale area; and determining a pixel point with a grayscale value being greater than a second set threshold value from the second grayscale area as a pixel point not matching the grayscale feature of the second grayscale area;

step 206: locating a contour of a pixel defect area composed of the pixel defect point;

step 207: calculating an area and a center-of-mass coordinate of the pixel defect area according to the contour of a pixel defect area; and step 208: determining the pixel defect of the optical module on a display screen of the optical module according to the area and the center-of-mass coordinate of the pixel defect area.

Figure 2B:
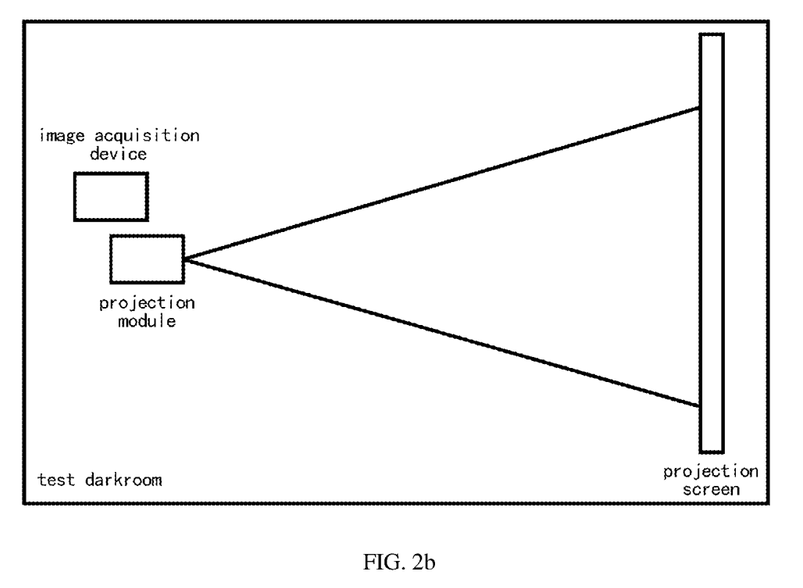
FIG. 2b is a schematic diagram of an application scenario according to an embodiment of the present disclosure.
Figure 2C:
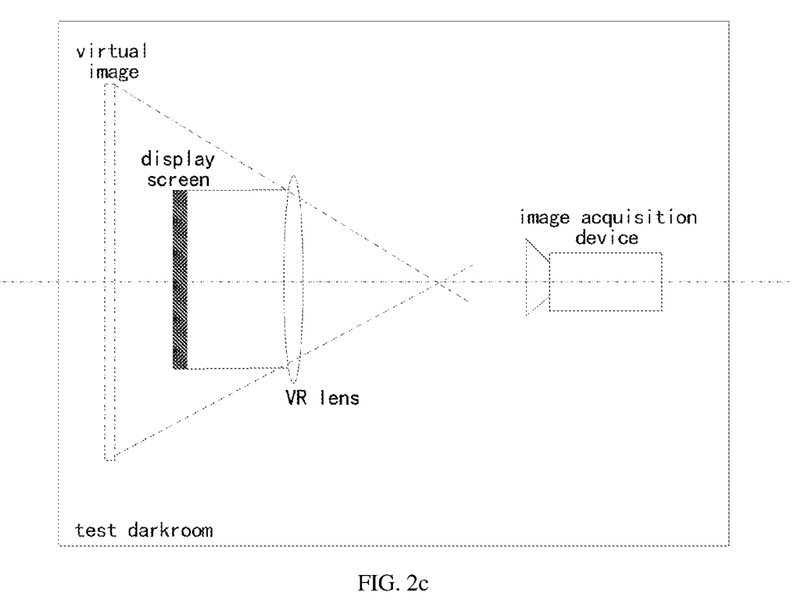
FIG. 2c is a schematic diagram of an application scenario according to another embodiment of the present disclosure.

In step 201, when the optical module is a projection module, an image acquisition device can be used to take a picture of the image projected by the projection module onto the projection screen on the side of the optical module, as shown in FIG. 2b, for example. When the optical module is a VR module, an image acquisition device can be used to take a picture of the virtual image imaged by the VR lens on the display screen of the VR module at the exit pupil of the VR module, as shown in FIG. 2c.

Optionally, in this step, a grayscale camera can be directly used to collect the image obtained by imaging the test binary image by the optical module, and then the first grayscale image can be obtained; or after the color camera is used for shooting, the obtained image is subjected to graying, which is not limited in this embodiment.

In addition, it should be noted that, when detecting pixel defect in this embodiment, in order to ensure that there is no omission in the comprehensive detection, multiple different test binary images may be used to perform multiple inspections on the optical module. In this embodiment, taking into consideration the detection efficiency and the detection effect, two test binary images are designed, and the two test binary images are used to detect pixel defect of the optical module respectively.

Figure 2D:
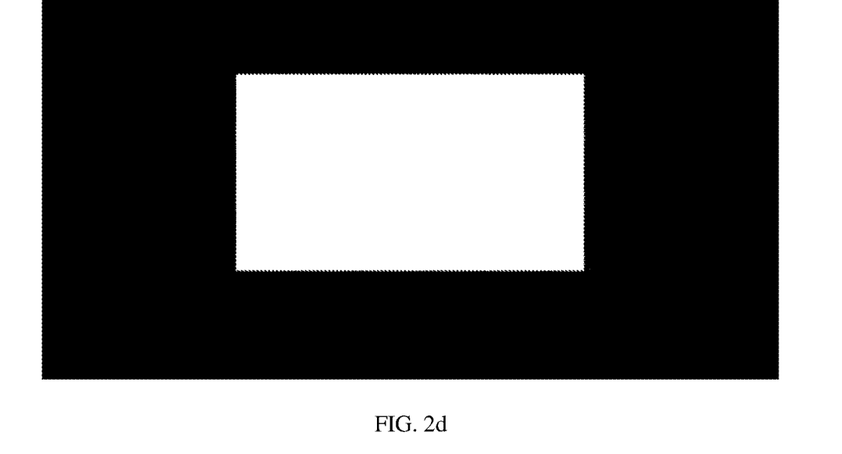
FIG. 2d is a schematic diagram of a first test binary image according to an embodiment of the present disclosure.
Figure 2E:
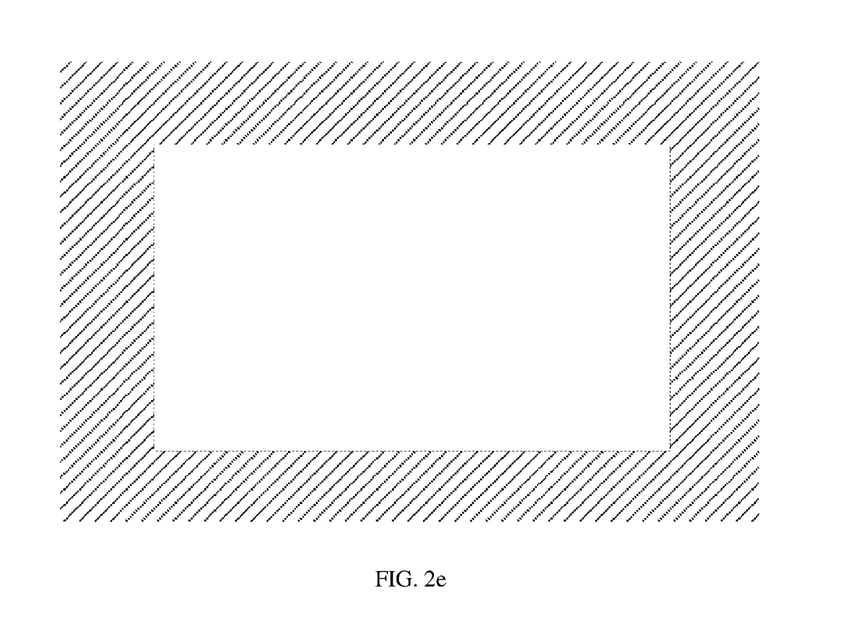
FIG. 2e is a schematic diagram of a second test binary image according to an embodiment of the present disclosure.

The test binary image can be composed of a regular pattern, such as a circle or a rectangle, so as to facilitate subsequent image area division of the first grayscale image according to the gray distribution. Optionally, in this embodiment, a rectangular pattern can be selected to form a test binary image. The first test binary image used in this embodiment may be as shown in FIG. 2d, the white pattern is a white rectangle in the center of the first test binary image, and the black pattern is a black rectangular frame wrapping around the white rectangle. The second test binary image can be as shown in FIG. 2e, the black pattern is a black rectangle at the center of the second test binary image, and the white pattern is a white rectangular frame wrapping around the black rectangle. It should be understood that in FIG. 2e, the diagonally filled part is a white rectangular frame, and the diagonally filled part is only used to clearly display the white rectangular frame under the interference of the background color. In practice, the part is white.

It should be noted that, in the first test binary image and the second test binary image, a proportion of the white rectangle in the first test binary image is not equal to a proportion of black rectangle in the second test binary image. The advantage of this design is to avoid the position overlap between the boundary between the white rectangle and the black frame in the first test binary image and the boundary between the black rectangle and the white frame in the second test binary image, which overcomes defect of reduced accuracy of pixel defect identifying at overlapped boundary.

In steps 202 and 204, the grayscale distribution, that is, the brightness change of the first grayscale image. When analyzing the gray distribution of the first grayscale image line by line, edge detection operators can be used, such as Roberts Cross operator, Prewitt operator, Sobel operator, Kirsch operator, compass operator, Canny operator and/or Laplacian Operators, etc., to detect a pixel with large brightness change in each pixel row of the first grayscale image, and use them as pixels located on the boundary in each pixel row.

In the first grayscale image, the first grayscale area and the second grayscale area respectively correspond to the white pattern and the black pattern in the test binary image, so the pixel at the boundary will have obvious grayscale change. The above-mentioned edge detection operators can detect the gray level change of each pixel, and determine whether the pixel is a boundary pixel based on the set gray contrast threshold. The set gray contrast threshold is an empirical value, which can be determined according to the results of multiple tests, and this embodiment does not limit this.

After determining the boundary pixel in the first grayscale image, the first grayscale image can be divided into the first grayscale area corresponding to the white pattern in the test binary image and the second grayscale area corresponding to the black pattern according to the boundary pixel.

In step 205, the grayscale of the pixels in the first grayscale area is close to white, so the grayscale value is relatively large. When the pixel value of the pixel in the first grayscale area is less than the first set threshold, it can be considered that the pixel does not match the grayscale feature of the first grayscale area. The grayscale of the pixel in the second grayscale area is close to black, so the grayscale value is relatively large. When the pixel value of the pixel in the second grayscale area is greater than the second set threshold, it can be considered that the pixel does not match the grayscale feature of the second grayscale area.

The first set threshold and the second set threshold are empirical values. Taking an 8-bit image as an example, the first set threshold may be 40 and the second set threshold may be 60. Of course, the above values are for example only, and are not limited in practice.

In steps 206 and 207, optionally, after determining the pixel defect point on the first grayscale image, at least one contour of a pixel defect area composed of the pixel defect point can be determined according to the coordinate of each pixel defect point in the first grayscale image.

It should be understood that, in practice, for some optical modules enlarging image, one pixel unit on the display screen may correspond to multiple pixel points on the first grayscale image. In other words, when there is a defect pixel unit on the optical module, one or more defective pixels may appear on the first gray scale image. Therefore, in this step, the contour location of the pixel defect area composed of pixel defect points on the first grayscale image can be performed, and the center-of-mass coordinate of the pixel defect area can be calculated based on the determined contour. It can be considered that on the display screen of the optical module, the pixel unit corresponding to the center-of-mass coordinate is in the non-working state, or the pixel unit corresponding to the center-of-mass coordinate is the center-of-mass of a region composed of multiple pixel units in the non-working state.

Further, the area of the pixel defect area on the first grayscale image can be determined. Based on the area and the center-of-mass coordinates, the defect pixel unit on the optical module display screen can be quickly found.

Optionally, in step 208, after determining the center-of-mass coordinate and area of the pixel defect area on the first grayscale image, the center-of-mass coordinate and area can be mapped to the display screen of the optical module, the the pixel gray unit corresponding to the center-of-mass coordinate is searched, and the pixel defect on the optical module is determined according to the pixel gray unit corresponding to the center-of-mass coordinate and the area of the pixel defect area.

It should be noted that in this embodiment, the first test binary map and the second test binary map may be used to perform two detections on the optical module. For each detection step, please refer to the records in step 201 to step 208, which will not repeat it here.

In this embodiment, at least two black and white binary images are used as test images to make the optical module image, so that the process of detecting pixel defect of the optical module is more efficient, and the detection result is more comprehensive and reliable.

In addition, it should be noted that the expressions herein of "first", "second", etc. are intended to distinguish between different messages, devices, modules, etc., and are not intended to represent a sequential order, nor is it intended to limit that "first" and "second" are of different types.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Figure 3:
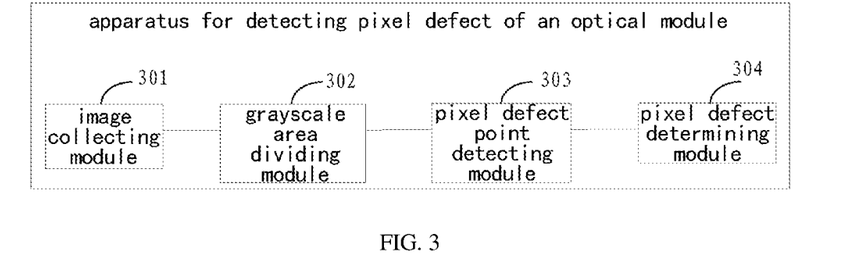
FIG. 3 is a schematic structural diagram of an apparatus for detecting pixel defect of an optical module according to an embodiment of the present disclosure.

The optional implementation of method for detecting pixel defect of an optical module is described above. As shown in FIG. 3, in practice, the method for detecting pixel defect of an optical module can be implemented by an apparatus for detecting pixel defect of an optical module, as shown in FIG. 3, The apparatus includes:

an image collecting module 301, configured to gray an image obtained by imaging a test binary image by an optical module in a darkroom environment to obtain a first grayscale image; a grayscale area dividing module 302, configured to determine a pixel point not matching a grayscale feature of respective grayscale region from the first grayscale area and the second grayscale area respectively as a pixel defect point; a pixel defect point detecting module 303, configured to determine a pixel point not matching a grayscale feature of respective grayscale region from the first grayscale area and the second grayscale area respectively as a pixel defect point; and a pixel defect determining module 304, configured to determine the pixel defect of the optical module according to the pixel defect point.

Further optionally, the pixel defect determining module 304 is specifically configured to: locate a contour of a pixel defect area composed of the pixel defect point; calculate an area and a center-of-mass coordinate of the pixel defect area according to the contour of a pixel defect area; and determine the pixel defect of the optical module on a display screen of the optical module according to the area and the center-of-mass coordinate of the pixel defect area.

Further optionally, the grayscale area dividing module 302 is specifically configured to: analyze a grayscale distribution of the first grayscale image line by line; determine a pixel point with a grayscale change greater than a set grayscale contrast as a boundary pixel point based on the grayscale distribution; and divide the first grayscale image into the first grayscale area and the second grayscale area according to the boundary pixel point.

Further optionally, the test binary image includes: a white pattern with a gray level of 1 and a black pattern with a gray level of 0; the first grayscale area and the second grayscale area are image areas in the first grayscale image corresponding to the white pattern and the black pattern in the test binary image respectively.

Further optionally, the pixel defect point detecting module 303 is specifically configured to: determine a pixel point with a grayscale value being less than a first set threshold value from the first grayscale area as a pixel point not matching the grayscale feature of the first grayscale area; and determine a pixel point with a grayscale value being greater than a second set threshold value from the second grayscale area as a pixel point not matching the grayscale feature of the second grayscale area.

Further optionally, the test binary image includes: a first test binary image and a second test binary image; where, in the first test binary image, the white pattern is a white rectangle being located at a center of the first test binary image, and the black pattern is a black rectangular frame wrapping around the white rectangle; in the second test binary image, the black pattern is a black rectangle being located at a center of the second test binary image, and the white pattern is a white rectangular frame wrapping around the black rectangle.

Further optionally, a proportion of the white rectangle in the first test binary image is not equal to a proportion of black rectangle in the second test binary image.

The above-mentioned apparatus for detecting pixel defect of an optical module can execute the method detecting pixel defect of an optical module according to the embodiment of the present disclosure, and has functional modules and beneficial effects corresponding to the execution method. For technical details that are not described in detail in this embodiment, refer to the method provided in the embodiment of the present disclosure, and will not be repeated.

Figure 4:
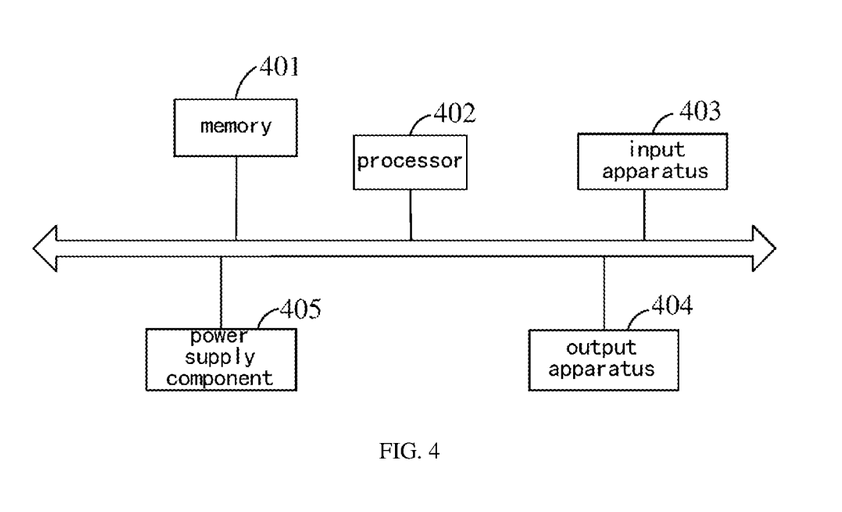
FIG. 4 is a schematic structural diagram of an electronic device according to an embodiment of the present disclosure.

The internal structure and function of the apparatus for detecting pixel defect of an optical module are described above. In practice, the apparatus for detecting pixel defect of an optical module can be represented as an electronic device. As shown in FIG. 4, the electronic device includes a memory 401, a processor 402, an input apparatus 403, and an output apparatus 404.

The memory 401, the processor 402, the input apparatus 403, and the output apparatus 404 may be connected by a bus or other means. The bus connection is taken as an example in FIG. 4.

The memory 401 is used to store one or more computer instructions, and can be configured to store various other data to support operations on the device for detecting pixel defect of an optical module. Examples of such data include instructions of any application or method operated on the device for detecting pixel defect of an optical module.

The memory 401 can be implemented by any type of volatile or non-volatile storage device or a combination of them, such as static random access memory (SRAM for short), electrically erasable programmable read-only memory (EEPROM for short), erasable Programmable Read Only Memory (EPROM for short), Programmable Read Only Memory (PROM for short), Read Only Memory (ROM for short), Magnetic Memory, Flash Memory, Magnetic Disk or Optical Disk.

In some embodiments, the memory 401 may optionally include a memory remotely set with respect to the processor 402, and the remote memory may be connected to the device for detecting pixel defect of an optical module via a network. Examples of the aforementioned network include but are not limited to the Internet, corporate intranet, local area network, mobile communication network, and combinations thereof.

The processor 402 is coupled with the memory 401, and is configured to execute the one or more computer instructions for executing the method provided in the embodiment corresponding to FIG. 1 to FIG. 2a.

The input apparatus 403 can receive inputted number or character information, and generate key signal input related to user setting and function control of the device for detecting pixel defect of an optical module. The output apparatus 404 may include a display device such as a display screen.

Further, as shown in FIG. 4, device for detecting pixel defect of an optical module further includes: a power supply component 405. The power supply component 405 provides power for various components of the device where the power supply component is located. The power supply component may include a power management system, one or more power supplies, and other components associated with generating, managing, and distributing power for the device where the power supply component is located.

The aforementioned device for detecting pixel defect of an optical module can execute the method for detecting pixel defect of an optical module provided by the embodiments of the present disclosure, and has the corresponding functional modules and beneficial effects for the execution method. Technical details that are not described in detail in the present embodiment can refer to the method provided in the embodiment of the present disclosure, and will not be repeated. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A method for detecting pixel defect of an optical module, comprising:
   graying an image obtained by imaging a test binary image by an optical module in a darkroom environment to obtain a first grayscale image;
   determining a first grayscale area and a second grayscale area corresponding to two gray levels in the test binary image from the first grayscale image;
   determining a pixel point not matching a grayscale feature of respective grayscale region from the first grayscale area and the second grayscale area respectively as a pixel defect point; and
   determining the pixel defect of the optical module according to the pixel defect point.

2. The method according to claim 1, wherein the determining the pixel defect of the optical module according to the pixel defect point comprises:
   locating a contour of a pixel defect area composed of the pixel defect point;
   calculating an area and a center-of-mass coordinate of the pixel defect area according to the contour of a pixel defect area; and
   determining the pixel defect of the optical module on a display screen of the optical module according to the area and the center-of-mass coordinate of the pixel defect area.

3. The method according to claim 1, wherein the determining the first grayscale area and the second grayscale area corresponding to two gray levels in the test binary image from the first gray scale image comprises:
   analyzing a grayscale distribution of the first grayscale image line by line;

determining a pixel point with a grayscale change greater than a set grayscale contrast as a boundary pixel point based on the grayscale distribution; and dividing the first grayscale image into the first grayscale area and the second grayscale area according to the boundary pixel point.

4. The method according to claim 1, wherein the test binary image comprises: a white pattern with a gray level of 1 and a black pattern with a gray level of 0;

the first grayscale area and the second grayscale area are image areas in the first grayscale image corresponding to the white pattern and the black pattern in the test binary image respectively.

5. The method according to claim 4, wherein the determining the pixel point not matching the grayscale feature of respective grayscale region from the first grayscale area and the second grayscale area respectively as a pixel defect point comprises:

determining a pixel point with a grayscale value being less than a first set threshold value from the first grayscale area as a pixel point not matching the grayscale feature of the first grayscale area; and determining a pixel point with a grayscale value being greater than a second set threshold value from the second grayscale area as a pixel point not matching the grayscale feature of the second grayscale area.

6. The method according to claim 4, wherein the test binary image comprises: a first test binary image and a second test binary image; wherein, in the first test binary image, the white pattern is a white rectangle being located at a center of the first test binary image, and the black pattern is a black rectangular frame wrapping around the white rectangle;

in the second test binary image, the black pattern is a black rectangle being located at a center of the second test binary image, and the white pattern is a white rectangular frame wrapping around the black rectangle.

7. The method according to claim 6, wherein a proportion of the white rectangle in the first test binary image is not equal to a proportion of black rectangle in the second test binary image.

8. An apparatus for detecting pixel defect of an optical module, comprising:

an image collecting module, configured to gray an image obtained by imaging a test binary image by an optical module in a darkroom environment to obtain a first grayscale image;

a grayscale area dividing module, configured to determine a pixel point not matching a grayscale feature of respective grayscale region from the first grayscale area and the second grayscale area respectively as a pixel defect point;

a pixel defect point detecting module, configured to determine a pixel point not matching a grayscale feature of respective grayscale region from the first grayscale area and the second grayscale area respectively as a pixel defect point; and a pixel defect determining module, configured to determine the pixel defect of the optical module according to the pixel defect point.

9. The apparatus according to claim 8, wherein the pixel defect determining module is specifically configured to:

locate a contour of a pixel defect area composed of the pixel defect point;

calculate an area and a center-of-mass coordinate of the pixel defect area according to the contour of a pixel defect area; and determine the pixel defect of the optical module on a display screen of the optical module according to the area and the center-of-mass coordinate of the pixel defect area.

10. An electronic device, comprising: a memory and a processor; wherein, the memory is used to store at least one computer instruction;

the processor is coupled with the memory for executing the method according to claim 1.

11. The method according to claim 2, wherein the test binary image comprises: a white pattern with a gray level of 1 and a black pattern with a gray level of 0;

the first grayscale area and the second grayscale area are image areas in the first grayscale image corresponding to the white pattern and the black pattern in the test binary image respectively.

12. The method according to claim 3, wherein the test binary image comprises: a white pattern with a gray level of 1 and a black pattern with a gray level of 0;

the first grayscale area and the second grayscale area are image areas in the first grayscale image corresponding to the white pattern and the black pattern in the test binary image respectively.

13. The apparatus according to claim 8, wherein the grayscale area dividing module is specifically configured to:

analyze a grayscale distribution of the first grayscale image line by line;

determine a pixel point with a grayscale change greater than a set grayscale contrast as a boundary pixel point based on the grayscale distribution; and divide the first grayscale image into the first grayscale area and the second grayscale area according to the boundary pixel point.

14. The apparatus according to claim 8, wherein the test binary image includes: a white pattern with a gray level of 1 and a black pattern with a gray level of 0;

the first grayscale area and the second grayscale area are image areas in the first grayscale image corresponding to the white pattern and the black pattern in the test binary image respectively.

15. The apparatus according to claim 9, wherein the test binary image includes: a white pattern with a gray level of 1 and a black pattern with a gray level of 0;

the first grayscale area and the second grayscale area are image areas in the first grayscale image corresponding to the white pattern and the black pattern in the test binary image respectively.

16. The apparatus according to claim 14, wherein the test binary image includes: a white pattern with a gray level of 1 and a black pattern with a gray level of 0;

the first grayscale area and the second grayscale area are image areas in the first grayscale image corresponding to the white pattern and the black pattern in the test binary image respectively.

17. The apparatus according to claim 14, wherein the pixel defect point detecting module is specifically configured to:

determine a pixel point with a grayscale value being less than a first set threshold value from the first grayscale area as a pixel point not matching the grayscale feature of the first grayscale area; and determine a pixel point with a grayscale value being greater than a second set threshold value from the second grayscale area as a pixel point not matching the grayscale feature of the second grayscale area.

18. The apparatus according to claim 14, wherein the test binary image includes: a first test binary image and a second test binary image; wherein,
- in the first test binary image, the white pattern is a white rectangle being located at a center of the first test binary image, and the black pattern is a black rectangular frame wrapping around the white rectangle;
- in the second test binary image, the black pattern is a black rectangle being located at a center of the second test binary image, and the white pattern is a white rectangular frame wrapping around the black rectangle.

19. The apparatus according to claim 18, wherein a proportion of the white rectangle in the first test binary image is not equal to a proportion of black rectangle in the second test binary image.

* * * * *